(12) United States Patent
Laycock

(10) Patent No.: US 8,079,440 B2
(45) Date of Patent: Dec. 20, 2011

(54) DETERMINING THE POLARITY OF MOVEMENT OF AN ACTUATOR MASS IN A SEISMIC VIBRATOR

(75) Inventor: Martin Laycock, Asker (NO)

(73) Assignee: Westerngeco L.L.C., Houston, TX (US)

( * ) Notice: Subject to any disclaimer, the term of this patent is extended or adjusted under 35 U.S.C. 154(b) by 0 days.

(21) Appl. No.: 12/693,686

(22) Filed: Jan. 26, 2010

(65) Prior Publication Data

US 2011/0180346 A1    Jul. 28, 2011

(51) Int. Cl.
*G01V 1/02* (2006.01)
*G01V 1/147* (2006.01)

(52) U.S. Cl. ............... 181/121; 181/107; 181/113

(58) Field of Classification Search ........... 181/121, 181/113, 114, 107, 111, 106
See application file for complete search history.

(56) References Cited

U.S. PATENT DOCUMENTS

| | | | |
|---|---|---|---|
| 4,147,228 A * | 4/1979 | Bouyoucos | 181/119 |
| 4,173,749 A | 11/1979 | Corkhill | |
| 4,248,324 A * | 2/1981 | Mifsud | 181/121 |
| 4,428,238 A * | 1/1984 | Tauscher | 73/663 |
| 4,519,053 A | 5/1985 | Bedenbender | |
| 4,692,912 A | 9/1987 | Mueller et al. | |
| 4,785,431 A | 11/1988 | Myers | |
| 4,797,862 A * | 1/1989 | Wisotsky | 367/143 |
| 4,821,246 A * | 4/1989 | Van Kampen et al. | 367/189 |
| RE32,995 E * | 7/1989 | Fair | 181/119 |
| 4,850,449 A * | 7/1989 | Cheung | 181/101 |
| 5,331,607 A * | 7/1994 | Roessler | 367/189 |
| 5,822,269 A * | 10/1998 | Allen | 367/41 |
| 6,552,961 B1 | 4/2003 | Bremner et al. | |
| 7,639,567 B2 * | 12/2009 | Sitton et al. | 367/189 |
| 2006/0158962 A1 | 7/2006 | Jeffryes | |
| 2007/0133354 A1 | 6/2007 | Bagaini et al. | |
| 2010/0276224 A1 * | 11/2010 | Wei | 181/121 |

OTHER PUBLICATIONS

"Seismic source." Wikipedia, The Free Encyclopedia. <http://en.wikipedia.org/wiki/Seismic_source>, 3 pages (Jun. 2008).

* cited by examiner

*Primary Examiner* — Edgardo San Martin
(74) *Attorney, Agent, or Firm* — Dan C. Hu; Kevin B. McGoff; Kevin P. McEnancy

(57) ABSTRACT

A technique or mechanism for use with a vibrator to be employed for subterranean surveying includes receiving, from a sensor, a unipolar indication of movement of an actuator mass of the vibrator. According to the indication from the sensor, a correlation is determined between the movement of the actuator mass and a reference signal provided to cause movement of the actuator mass.

22 Claims, 3 Drawing Sheets

DETERMINING THE POLARITY OF MOVEMENT OF AN ACTUATOR MASS IN A SEISMIC VIBRATOR

BACKGROUND

Seismic surveying is used to perform characterization of subterranean elements in a subterranean structure. Examples of subterranean elements of interest include hydrocarbon and mineral bearing structures, fresh water aquifers, gas injection zones, and other subterranean elements. Seismic surveying is performed by deploying seismic sources (e.g., air guns, vibrators, explosives, etc.) and seismic receivers (e.g., hydrophones, geophones, etc.). The seismic sources are used to produce seismic waves (e.g., acoustic waves) that are propagated into the subterranean structure, with some of these seismic waves reflected and or refracted from the subterranean elements of interest and received by the seismic receivers.

One type of seismic source is impulsive, such as dynamite or one or more air gun(s) for generating seismic signals. With an impulsive energy source, a large amount of energy is produced in a relatively short period of time. Another type of seismic source is a seismic vibrator that imparts a signal at a lower energy level but over a longer period of time.

A type of seismic vibrator employs a servo-hydraulic actuator mounted on a carrier vehicle and controlled by a control system to impart seismic signals into the earth. Such an actuator includes a mass that is supported on a fixed double acting piston. The piston is fixed to a baseplate that is held in contact with the ground. Movement of the actuator mass causes the baseplate to transmit energy into the earth.

During this operation the weight of the vehicle is supported on the baseplate (via isolation devices), so that the baseplate does not decouple from the surface. The movement of the actuator mass is controlled by an electrical drive signal, derived from a reference signal, both provided by a control system. The drive signal can be conditioned to cause the mass to move in either direction. The mass is driven via a torque motor and one or more hydraulic servo valve stages.

During operation of the vibrator the reference signal can be generated in the form of a sinusoidal wave that changes frequency at a controlled rate. Such a signal is termed a sweep and is characterized by start and end frequencies and fixed or variable rates of change of frequency and amplitude. Other forms of signals such as band filtered pseudo-random series may also be used.

In order to control the transmitted energy, various sensors mounted on the actuator provide signals that are used by the control system. In a common system, the drive signal operates a torque motor connected to the mass via two stages of servo hydraulics. With this system, changes in the level of the drive signal would change the acceleration of the mass and control of the output energy would be difficult. Sensor measurements of the displacement of the main valve and the displacement of the mass are used as feedback signals for control loops in the control system. The addition of these control loops allows mass displacement to be controlled, allowing easier control of the output energy. Conventionally, both these sensors are bipolar, in that they measure positive and negative displacements from a center zero.

Other sensors are used to estimate the energy output of the actuator and to allow the drive signal to be adjusted to make the output energy more closely match the reference signal in amplitude and phase, while minimizing distortions. Commonly, single or multiple accelerometers are mounted on both the mass and the baseplate or its supporting structure. These accelerometers are also bipolar, in that they measure both positive and negative acceleration.

As the sensors described above produce analog outputs and are bipolar, sensor measurement polarity can be reversed by a badly wired cable or connector. It is possible to replace a defective component or cable on a vibrator, and introduce a polarity reversal, such that the measured energy output appears to have the correct phase relationship to the reference, but in fact the actual motion of the actuator is anti-phase.

Conventionally, testing techniques are used to confirm the polarity of a seismic vibrator. While many different polarity conventions are possible, it is important to establish the direction of movement of the actuator mass when the controller provides a known stimulus as the reference signal. The components in the control system and actuator that either drive the mass or make measurements may be connected in one of two polarities. Testing the polarity of a seismic vibrator can be a time consuming process, is subject to human errors and usually has to be repeated regularly and following maintenance work on the seismic vibrator.

SUMMARY

In general, according to an embodiment, a method for use with a vibrator to be employed for seismic surveying includes receiving, from a sensor, a non-bipolar indication of movement of an actuator mass of the vibrator. The sensor is mounted in a fixed reference position, such that about the polarity of the sensor's measurements is known. When the readings from this sensor are correlated with respect to the reference signal, an indication regarding whether the polarity of movement of the actuator mass of the vibrator is correct may be deduced.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
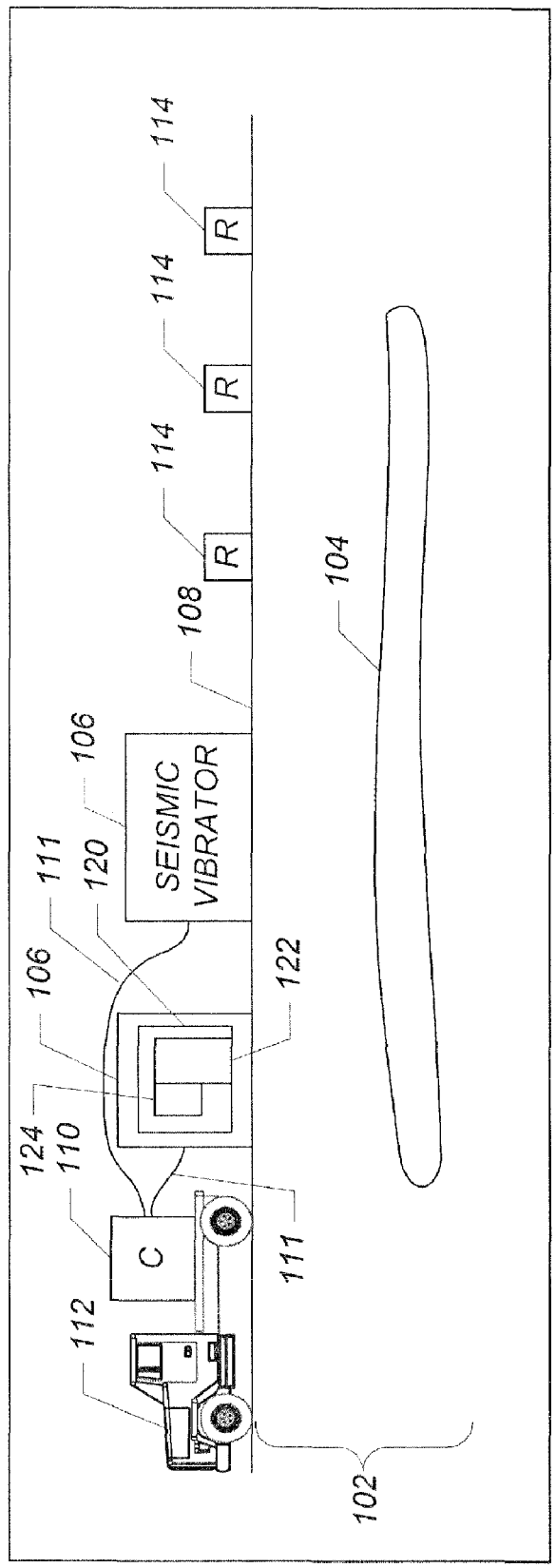
FIG. 1 illustrates an exemplary seismic survey arrangement that incorporates a seismic vibrator according to an embodiment.

FIG. 1 depicts an exemplary arrangement for performing a survey of a subterranean structure 102 that includes one or more subterranean elements 104 of interest. Examples of the subterranean elements of interest 104 include hydrocarbon and mineral bearing structures, fresh water aquifers, gas injection zones, and other subterranean elements.

The survey arrangement depicted in FIG. 1 is an example of a land-based survey arrangement. In alternative implementations, the survey arrangement can be a marine-based, where a survey is performed in water or on the sea floor, or it may be a subsurface arrangement, where elements of a survey are carried out underground in mines or boreholes.

As depicted in FIG. 1, one or more seismic sources, in the form of seismic vibrators 106, are provided on a land surface 108. The survey arrangement in which seismic vibrators 106 are used can also be referred to as a Vibroseis survey.

Each seismic vibrator 106 includes a carrying vehicle 120 that supports an actuator 122, and a vibrator control system 124 to control the actuator. While a seismic vibrator can operate in isolation, it may be connected to a controller 110 in an acquisition system, which is depicted in as being deployed on a truck 112.

The controller 110 can be a computer or other type of electronic device that is able to control operation of the seismic vibrators 106 by sending control signals over a link 111 (e.g., optical link, electrical cable, radio or wireless link, etc.).

Also depicted in FIG. 1 are seismic receivers 114 deployed on the land surface 108. Examples of the seismic receivers include geophones, hydrophones, accelerometers, and so forth.

Acoustic signals generated by the seismic vibrators 106 are directed into the subterranean structure 102. A portion of the acoustic signals is reflected or refracted back toward the land surface 108, where it can be detected by the receivers 114. The data measured by the receivers 114 can be processed to determine characteristics of the subterranean structure 102, including indications of the presence of the subterranean element(s) 104 of interest.

Figure 2:
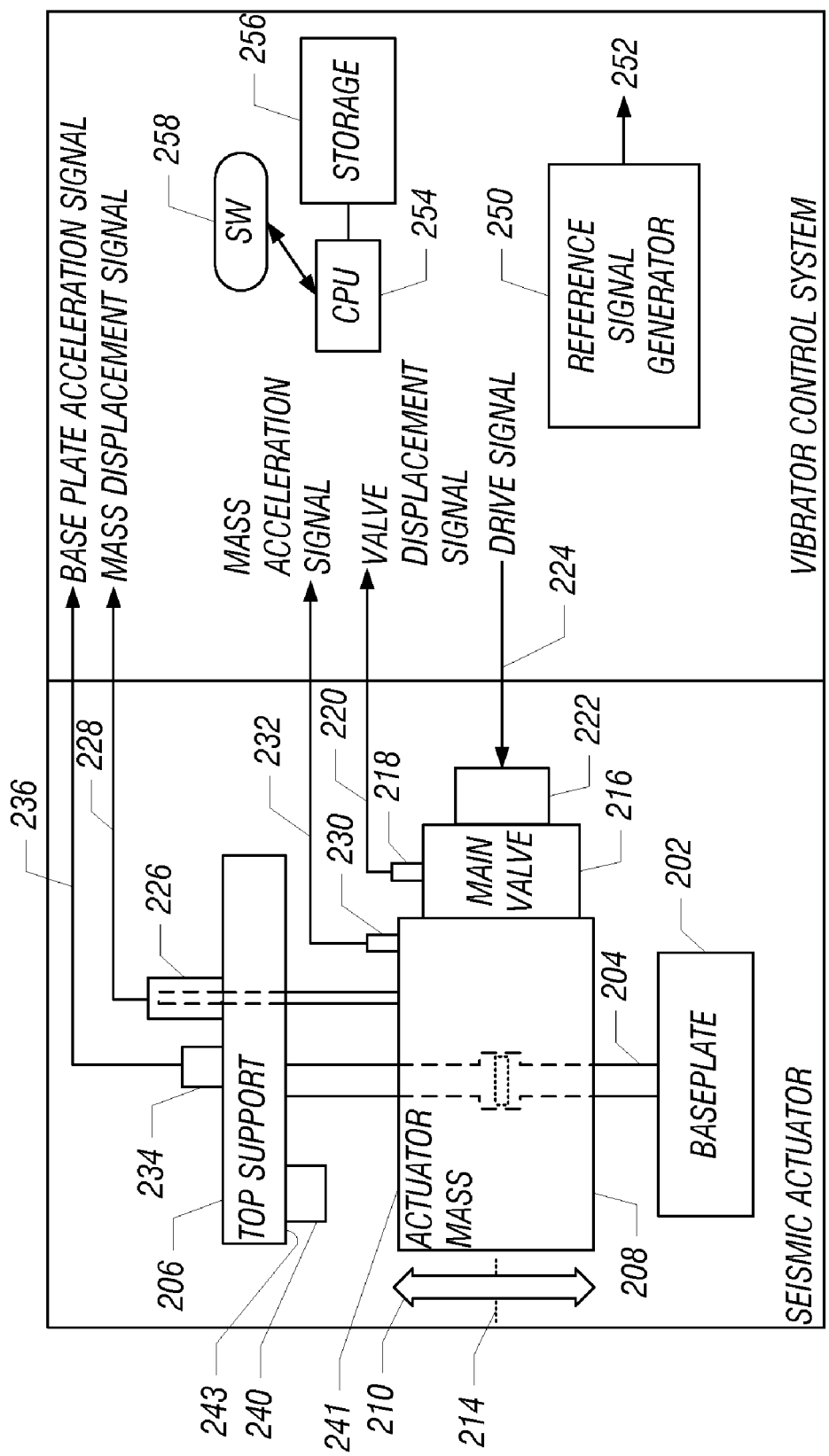
FIG. 2 is a schematic diagram of a seismic vibrator according to an embodiment.

FIG. 2 illustrates the seismic vibrator actuator 122 and the vibrator control system 124 that include components according to an embodiment. While the actuator 122 is depicted as a unit designed to generate vertical forces, it should be understood that the method is equally applicable to seismic vibrators designed to generate forces in other directions. While FIG. 2 illustrates a servo hydraulic actuator 122 operating in a land-based seismic survey it is also possible that a seismic vibrator may use other power sources, such as but not limited to electrical and may operate in other environments, including in water or on the seafloor in a marine environment, or underground in other applications.

A piston rod 204 is attached to a vibrator actuator baseplate 202, with the piston rod 204 extending generally vertically (in the view of FIG. 2) to an upper support 206. An actuator mass 208 is moveably mounted on the piston rod 204, with the actuator mass 208 moveable along a longitudinal direction (indicated by arrows 210) of the piston rod 204.

One of the components of the vibrator control system 124 is a reference generator 250. The reference generator 250 generates a reference signal 252. Using the reference signal 252 as one of its inputs, the vibrator control system 124 generates a drive signal 224 that is provided to control the movement of the actuator mass 208 along the longitudinal direction 210 of the piston rod 204. The drive signal is bipolar in nature, such that a positive current causes the mass 208 to move in one direction, while a negative current causes the mass 208 to move in the opposite direction.

The drive signal 224 controls a torque motor closely coupled to a pilot stage servo hydraulic valve 222, which in turn controls a main servo hydraulic valve 216, which in turn controls the movement of the mass 208. A sensor 218 mounted on the main valve 216 provides measurements 220 (valve displacement signal for indicating a displacement of the valve 216) to the vibrator control system 124, and a sensor 226 mounted on the top support 206 provides measurements 228 (mass displacement signal for indicating a displacement of the mass 208) to the vibrator control system 124. The measurements 220, 228 are further inputs (used as feedback signals) to the vibrator control system 124, when generating the drive signal 224. The measurements 220 and 228 are bipolar in nature, and adjusted for central zero position (e.g., 214 in FIG. 2). In other words, the measurements measure both positive and negative displacements with respect to a central zero position.

Other sensors are used to estimate the energy output of the actuator. Usually, single or multiple accelerometers are mounted on both the mass 208 (depicted single accelerometer 230) and the baseplate 202 or its supporting structure (depicted single accelerometer 234). The signals generated by the accelerometers (mass acceleration signal 232 and baseplate acceleration signal 236) form further inputs to the vibrator control system 124, allowing the drive signal 224 to be adjusted to make the output energy more closely match the reference signal in amplitude and phase, while minimizing distortions. The accelerometers from the accelerometers 230 and 234 are also bipolar, in that they measure both positive and negative acceleration.

In accordance with some embodiments, a new sensor 240 is provided in the actuator 122. In the example shown in FIG. 2, the sensor 240 is mounted underneath a bottom surface 243 of the top support 206. The sensor 240 is used for detecting displacement of the actuator mass 208 relative to a reference position, which in FIG. 2 is the position of the sensor 240. In one example, the sensor 240 can measure a distance between the sensor 240 and an upper surface 241 of the actuator mass 208. As the actuator mass 208 moves upwardly, the distance between the upper surface 241 of the mass and the sensor 240 decreases. On the other hand, as the actuator mass 208 moves downwardly, the distance between the upper surface 241 of the actuator mass 208 and the sensor 220 increases.

Any sensor device capable of withstanding the harsh environment of an operational actuator may be used as sensor 240, so long as it returns a unipolar signal, proportional to the distance between the mass 208 and the sensor 240. Examples of such sensors include laser distance measurement devices, single-ended linear variable differential transformers, or magnetic sensors. Unlike signals produced by bipolar sensors, the unipolar signal provided by the sensor 240 provides an indication of absolute displacement of the mass 208 relative to a fixed reference position, rather than indications of relative positive/negative offset to a central zero position. In other words, the sensor 240 is positioned such that measurements are made relative to a known position offset beyond the maximum offset of the mass 208, such that a minimum measurement produced by the sensor 240 implies a maximum displacement in a first direction and a maximum measurement implies a maximum displacement in the opposite direction.

The output signal from the sensor 240 can be subjected to signal conditioning performed in the vibrator control system 124 or addition systems. The conditioned output signal from the sensor 240 can be a time varying signal representing the time varying distance between the mass 208 and the sensor 240 mounted on the top support 206. Over time, as the distance between the actuator mass 208 and the sensor 220 progressively gets smaller, then that is an indication that the mass 208 is moving upwardly. On the other hand, over time, as the distance between the actuator mass 208 and the sensor 220 progressively increases, then that is an indication that the actuator mass 208 is moving downwardly.

Although FIG. 2 depicts just one sensor 240 to determine the relative displacement of the actuator mass 208, note that multiple sensors can be used in other embodiments.

The vibrator control system 124, or an additional system connected to the vibrator control system 124, includes additional processing software 258 that is executable on one or more central processing units (CPUs) 254 that is (are) connected to a storage 256 (e.g., memory, disk-based storage, etc.). The processing software 258 is aware of the known stimulus (in the form of the reference signal 252) and one or more of the conventional sensor signals 220, 228, 232 and 236 and the conditioned signal produced from the new sensor 240. These signals can be in the form of a time series (e.g., signal measurements at different time points) and may be stored in the storage 234 and may form the inputs for various comparison and correlation computations.

Tasks performed by the processing software 230 can include determining the direction of mass displacement as a consequence of a change in amplitude of the signal output by the sensor 240. In this manner, the processing software 230 can determine if the polarity of the vibrator actuator is correct, by comparing the direction of movement of the mass 208 to the polarity of the reference signal 252 output by the reference signal generator 252. A particular correlation is expected between the direction of movement of the mass 208 (as determined from the output of the sensor 240) and the polarity of the reference signal 252. For example, the particular correlation may be that it is expected that the mass 208 be moving upwardly when the reference signal 252 is positive, and that the mass 208 be moving downwardly when the reference signal 252 is negative. If the polarity is incorrect, then the vibrator control system can be programmed to take action such as generating an alert, or disabling the actuator 122.

Effectively, some embodiments allow for determining a correlation between the absolute movement of the actuator mass 208 and its perceived movement, derived from measured signals of the sensor 240, with respect to the reference signal 252 provided to cause movement of the actuator mass.

By using an automated technique according to some embodiments for determining correlation between the reference signal 252 and the movement of the actuator mass 208, manual confirmation of a position of the actuator mass during system configuration and setup would not have to be performed.

In some embodiments, the processing software 230 may additionally, by using the conventional sensor measurements 220, 228, 232 and 236, determine the source of a detected polarity error.

Further embodiments may allow polarity measurements, results and or calculations to be transmitted to the acquisition system or the controller (FIG. 1, 110). This would allow all or part of the task to be carried out in a remote additional system. Alternatively data could be presented to the acquisition operations staff operating the acquisition system, to allow them to provide independent judgment of the results.

Polarity measurements, results and or calculations may be stored separately or with the acquisition data to provide for future audit.

Other embodiments may substitute the new sensor 240 for the conventional mass displacement sensor 226 and provide the polarity detection and alert system within the core functionality of the vibrator control system.

In a simple embodiment the polarity determination system may be employed for specific tests to establish polarity as a result of a simple stimulus to the actuator in the form a step function (pulse) reference signal. In a more complex embodiment the polarity determination system may continually operate, monitoring every operation of the actuator.

Figure 3:
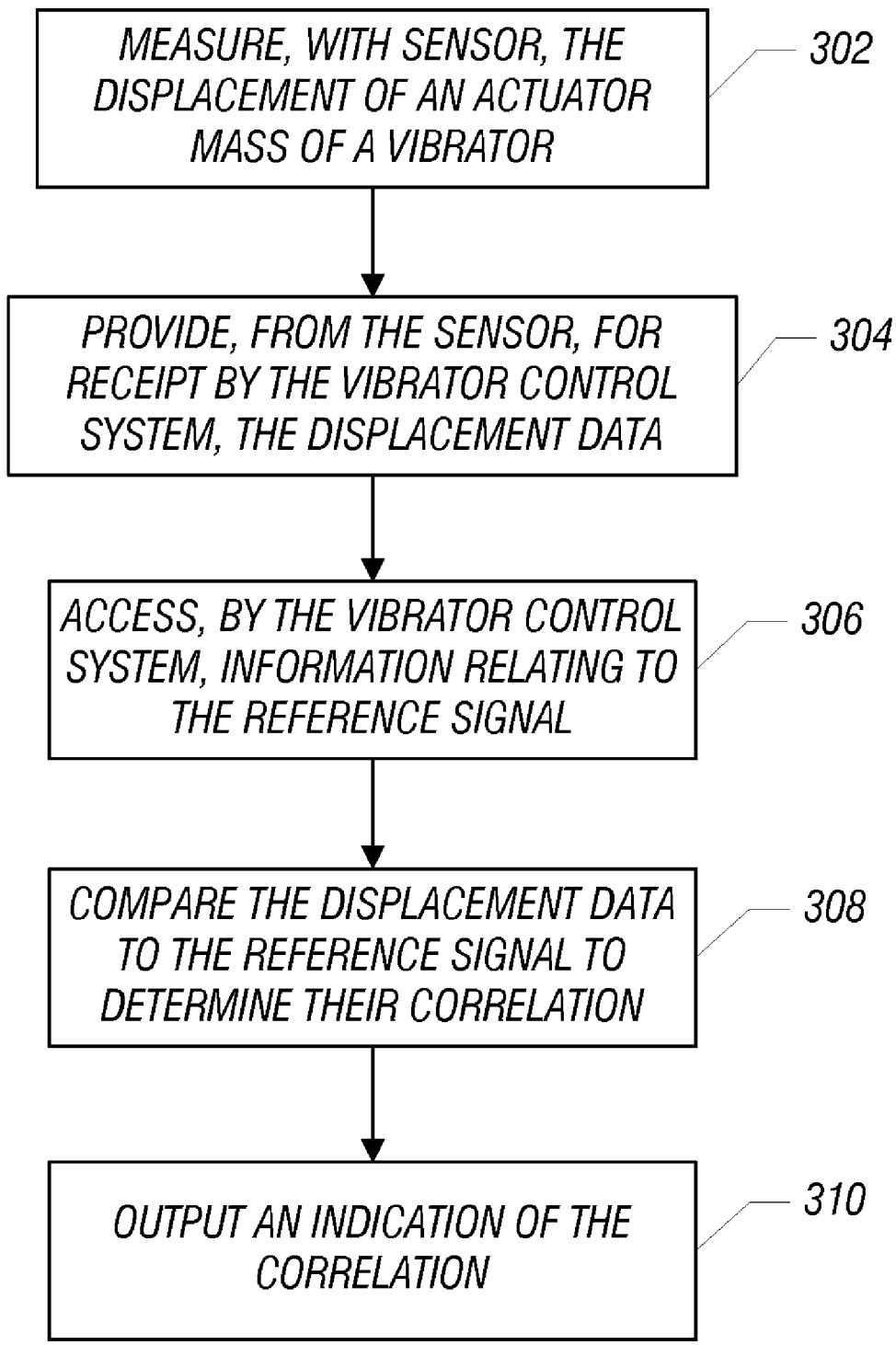
FIG. 3 is a flow diagram of a process according to an embodiment.

FIG. 3 depicts a procedure according to an embodiment. Displacements over time of an actuator mass of a vibrator are measured (at 302) with the sensor 240 (FIG. 2). The sensor provides (at 304) the displacement data (e.g., time series of displacement data) for receipt by the vibrator control system 124 (FIG. 2). The vibrator control system then accesses (at 306) information relating to the reference signal 252 (FIG. 2). The vibrator control system then compares (at 308) the displacement data to the reference signal to determine a correlation between the displacement data and the reference signal. An indication of the correlation can then be output (at 310) by the vibrator control system. In one example, the indication can be an alarm indicating that the polarity of the vibrator is incorrect.

The vibrator control system (124 of FIG. 2) may implemented as a single unit designed to take advantage of the measurements provided by the new sensor (240 in FIG. 2), or use these measurements instead of the conventional bipolar mass displacement sensor (226 of FIG. 2). Alternatively, the vibrator control system 124 may be implemented with a conventional vibrator controller operated in conjunction with or encapsulated by other systems to provide the described new functionality.

Instructions of software described above (including software 230 of FIG. 2) are loaded for execution on a processor (such as one or more CPUs 232 in FIG. 2). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A method for use with a seismic vibrator to be employed for subterranean surveying, comprising:
   receiving, from a sensor, a unipolar indication of movement of an actuator mass of the vibrator; and
   according to the indication from the sensor, determining, by a control system having a processor, a correlation between the movement of the actuator mass and a reference signal provided to cause the movement of the actuator mass, wherein determining the correlation comprises determining that a polarity of the movement of the actuator mass relative to the reference signal is incorrect.

2. The method of claim 1, further comprising providing an alert in response to determining that the polarity of the movement of the actuator mass relative to the reference signal is incorrect.

3. The method of claim 1, wherein receiving the unipolar indication of movement from the sensor comprises receiving an indication that is proportional to an amount of displacement between the sensor and the actuator mass, wherein the unipolar indication is different from a measurement of displacement relative to a zero center.

4. The method of claim 3, further comprising receiving, from a second sensor, a bipolar indication of movement of the actuator mass relative to the zero center.

5. The method of claim 1, wherein determining the correlation comprises comparing the indication of movement with an expected result.

6. The method of claim 1, wherein receiving the indication of movement comprises receiving displacements of the actuator mass over time.

7. The method of claim 1, wherein receiving the indication of movement from the sensor comprises receiving the indication of movement from the sensor selected from the group consisting of a laser sensor, a single-ended linear variable differential transformer, and a magnetic sensor.

8. The method of claim 1, further comprising:
providing the reference signal to a control mechanism of the vibrator to produce a drive signal that controls a drive mechanism to move the actuator mass in an oscillating manner, wherein the drive signal is based on the reference signal.

9. The method of claim 8, wherein oscillation of the actuator mass causes vibration to be generated in the vibrator to emit acoustic energy into a subterranean structure.

10. A system comprising:
a vibrator having an actuator mass moveable between different positions;
a sensor to detect unipolar displacement of the actuator mass with respect to a reference position; and
a processor to:
receive an indication of the unipolar displacement from the sensor; and
determine whether a polarity of movement of the actuator mass relative to a reference signal is correct, wherein the reference signal is provided to cause the movement of the actuator mass.

11. The system of claim 10, wherein the sensor is part of the vibrator.

12. The system of claim 10, wherein the vibrator comprises a seismic vibrator.

13. The system of claim 10, wherein the sensor is selected from the group consisting of a laser sensor, a single-ended linear variable differential transformer, and a magnetic sensor.

14. The system of claim 10, wherein the indication provided by the sensor is proportional to a displacement between the actuator mass and the reference position.

15. The system of claim 14, wherein the indication includes a time series to enable determination of the movement of the actuator mass over time.

16. The system of claim 14, further comprising a second sensor that provides a bipolar signal regarding movement of the actuator mass.

17. An article comprising at least one computer-readable storage medium containing instructions that when executed cause a computer to:
receive, from a sensor, a unipolar indication of movement of an actuator mass of a seismic vibrator; and
according to the indication from the sensor, determine a correlation between the movement of the actuator mass and a reference signal provided to cause the movement of the actuator mass, wherein determining the correlation comprises determining whether a polarity of the movement of the actuator mass relative to the reference signal is incorrect.

18. The article of claim 17, wherein determining the correlation comprises determining an amount of misalignment between the actuator mass movement and the reference signal.

19. The method of claim 8, wherein the control mechanism is part of the control system.

20. The method of claim 1, wherein determining the correlation comprises the control system comparing a direction of the movement of the actuator mass as indicated by the indication to a polarity of the reference signal.

21. The system of claim 10, wherein the processor is determine whether the polarity is correct by comparing a direction of the movement of the actuator mass as indicated by the indication to a polarity of the reference signal.

22. The article of claim 17, wherein determining the correlation comprises a comparing a direction of the movement of the actuator mass as indicated by the indication to a polarity of the reference signal.

* * * * *